(12) United States Patent
Boggs et al.

(10) Patent No.: US 11,138,787 B2
(45) Date of Patent: Oct. 5, 2021

(54) EFFICIENT TRANSFER OF DYNAMIC 3D WORLD MODEL DATA

(71) Applicant: Rockwell Collins, Inc., Cedar Rapids, IA (US)

(72) Inventors: Christopher M. Boggs, Gainesville, VA (US); Ramachandra J. Sattigeri, Ashburn, VA (US); Arjun Passi, Lynchburg, VA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/694,664

(22) Filed: Nov. 25, 2019

(65) Prior Publication Data

US 2021/0158608 A1  May 27, 2021

(51) Int. Cl.
*G06T 17/10* (2006.01)
*G06T 15/04* (2011.01)
(Continued)

(52) U.S. Cl.
CPC .......... *G06T 17/05* (2013.01); *G01C 21/3638* (2013.01); *G06T 15/04* (2013.01);
(Continued)

(58) Field of Classification Search
None
See application file for complete search history.

(56) References Cited

U.S. PATENT DOCUMENTS 5,999,187 A  12/1999  Dehmlow et al.
8,600,619 B2  12/2013  Bales et al.
(Continued)

FOREIGN PATENT DOCUMENTS

CN  1100706101  *  4/2019
EP  1495289 B1  6/2012
(Continued)

OTHER PUBLICATIONS

Claus Scheiblauer et al: "Out-of-core selection and editing of huge point clouds", Computers and Graphics, Elsevier, GB, vol. 35, No. 2, Jan. 7, 2011 (Jan. 7, 2011), pp. 342-351, XP028164982, ISSN 0097-8493, DOI: 10.1016/J.CAG.2011.01.004 [retrieved on Jan. 20, 2011].
(Continued)

*Primary Examiner* — Tapas Mazumder
(74) *Attorney, Agent, or Firm* — Suiter Swantz pc llo

(57) ABSTRACT

A system in a mobile platform creates a three-dimensional world model from sets of volume elements organized into sets of volume elements of increasing size and converted into an octree data structure. The system receives a request for a map of a specific, limited region and at a specific, limited level of detail and produces a reduced three-dimensional world model to conform to the limited region and level of detail. The reduced map is transmitted to the requesting platform and periodically updated. The map may be reduced by categorizing the lowest level of volume elements according to the worst case of any constituent volume elements. Alternatively, the system may indicate in the lowest level of volume elements whether the receiving platform would benefit from an increased level of detail.

13 Claims, 11 Drawing Sheets

(51) Int. Cl.
  *G06T 17/05* (2011.01)
  *G01C 21/36* (2006.01)
  *G06T 17/20* (2006.01)
  *G06T 19/20* (2011.01)

(52) U.S. Cl.
  CPC .............. *G06T 17/10* (2013.01); *G06T 17/20* (2013.01); *G06T 19/20* (2013.01); *G06T 2200/04* (2013.01); *G06T 2207/10028* (2013.01)

(56) References Cited

U.S. PATENT DOCUMENTS

| | | | |
|---|---|---|---|
| 10,109,103 | B2 | 10/2018 | Jenkins |
| 2014/0267282 | A1 | 9/2014 | Ren et al. |
| 2016/0275719 | A1 | 9/2016 | Oke |
| 2016/0358382 | A1* | 12/2016 | Lee .................... H04N 9/31 |
| 2017/0032569 | A1* | 2/2017 | Rondao Alface ..... G06T 15/205 |
| 2018/0005434 | A1 | 1/2018 | Ren et al. |
| 2018/0101932 | A1* | 4/2018 | Kwon .................. G06T 3/0068 |

FOREIGN PATENT DOCUMENTS

| | | |
|---|---|---|
| EP | 2617052 A2 | 7/2013 |
| EP | 3506212 A1 | 7/2019 |
| EP | 3825964 A2 | 5/2021 |

OTHER PUBLICATIONS

Extended Search Report for European Application No. 20209885.1 dated May 21, 2021, 9 pages.

Fickenscher Jorg et al.: "Cell -based update algorithm for occupancy grid maps and hybrid map for ADAS on embedded GPUs", 2018 Design, Automation & Test in Europe Conference & Exhibition (Date), EDAA, Mar. 19, 2018 (Mar. 19, 2018), pp. 443-448, XP033333894, DOI: 10.23919/DATE.2018.8342050 [retrieved on Apr. 19, 2018].

Markus Schuetz et al: "Potree: Rendering Large Point Clouds in Web Browsers", Sep. 19, 2016 (Sep. 19, 2016), XP055388659, Faculty of Informatics, Technical University Vienna, AUTRetrieved from the Internet: URL:https://publik.tuwien.ac.at/files/publik_252607.pdf [retrieved on Jul. 6, 2017].

* cited by examiner (a) LIDAR Point Cloud (b) Occupied Voxels (1m resolution)

Occupied Voxels (height map)

(c) Occupied and Free Voxels (1m resolution)

Free Voxels
Occupied Voxels (height map)

EFFICIENT TRANSFER OF DYNAMIC 3D WORLD MODEL DATA

BACKGROUND

Three-dimensional world models are useful for mobile platforms (such as helicopters, airplanes, drones, etc.) to plan safe routes through terrain. In many emerging autonomy/cognitive decision aiding avionics applications, there is a demand to distribute information between platforms extracted from a variety of three-dimensional perception sensors such as LIDAR, RADAR, Optical Structure from Motion, etc. Shared information may be used to create a common three-dimensional world model that depicts physical objects in the environment. The availability of a three-dimensional world model enables applications to understand the world within a given region of interest. With rapid access to this information across a network of connected mobile platforms, the capability of potential decision aiding functions is greatly expanded.

However, the sensors and equipment necessary to create the three-dimensional world model is expensive and cumbersome, making it infeasible to include in every mobile platform or very compact mobile platforms. In some circumstances, a lead platform can include all the equipment necessary to produce the three-dimensional world model and then share the three-dimensional world model with other, nearby platforms through a datalink connection.

In some environments, a datalink connection between the mobile platforms may be restricted or unreliable. In those cases, transferring the three-dimensional world model consumes excessive bandwidth.

It would be advantageous if there were a system and method for sharing three-dimensional world models with restricted bandwidth usage.

SUMMARY

In one aspect, embodiments of the inventive concepts disclosed herein are directed to a system in a mobile platform for creating a three-dimensional world model. The map is represented using an occupancy map of occupied/free/unknown probability states of the space, quantized by a grid of volume elements of a specific resolution. The volume elements are organized into sets of volume elements of increasing size and converted into an octree data structure. The system receives a request for a map of a specific, limited region and at a specific, limited level of detail. The system reduces the three-dimensional world model to conform to the limited region and level of detail and transmit the reduced map.

In a further aspect, the system periodically updates the reduced map when the three-dimensional world model is updated with new data.

In a further aspect, the system may reduce the map by categorizing the lowest level of volume elements according to the worst case of any constituent volume elements. Alternatively, the system may indicate in the lowest level of volume elements whether the receiver would benefit from an increased level of detail.

The method for maintaining the three-dimensional world model allows for dynamically vary the level of detail and region of interest to ensure adequacy for mission objectives while minimizing datalink bandwidth requirements. This minimization of bandwidth requirements enables more performance from the system, in terms of tighter and faster formation flight at lower height above ground level, which enables enhanced mission capability.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
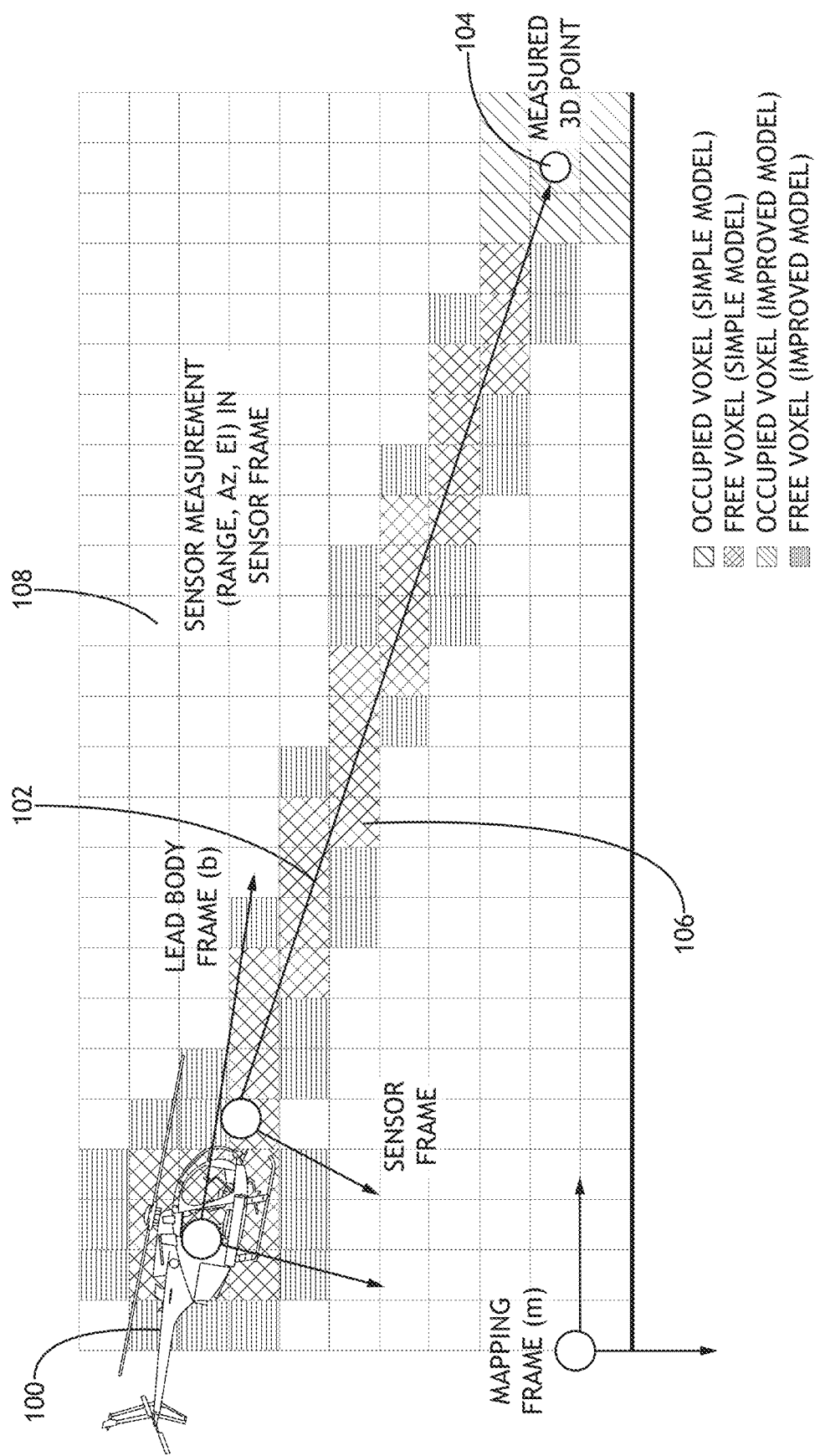
FIG. 1 shows a block representation of a mobile platform building a three-dimensional map of an environment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and method in a mobile platform for creating a three-dimensional world model from sets of volume elements organized into sets of volume elements of increasing size and converted into an octree data structure. The system receives a request for a map of a specific, limited region and at a specific, limited level of detail, and creates a reduced map to conform to the limited region and level of detail and transmit the reduced map.

Referring to FIG. 1, a block representation of a mobile platform 100 building a three-dimensional map of an environment is shown. The mobile platform 100 uses LIDAR, RADAR, other electromagnetic beam technology, or other such imaging technology; beams 102 from the mobile platform 100 at defined azimuth and elevation angles eventually reflect off objects 104 (such as terrain features) back to the mobile platform 100. When combined with sensor positions/orientations relative to a common mapping frame, the beam 102 endpoints may be used to compute a three-dimensional point cloud. Such reflection provides explicit evidence of occupancy. Likewise, all of the space that the beam 102 passed through to reach the object 102 is implicitly free space 106 because the beam 102 was not reflected. Wherever the beam 102 did not passthrough is unknown space 108 where the occupied probability is unknown.

Based on multiple point measurements, an occupancy map is produced that provides a three-dimensional depiction of the available free space, obstacles that should be avoided, and unknown space where more data is needed to proceed safely.

Figure 2A:
FIG. 2A shows a representation LIDAR generated point cloud generated from a mobile platform.
Figure 2B:
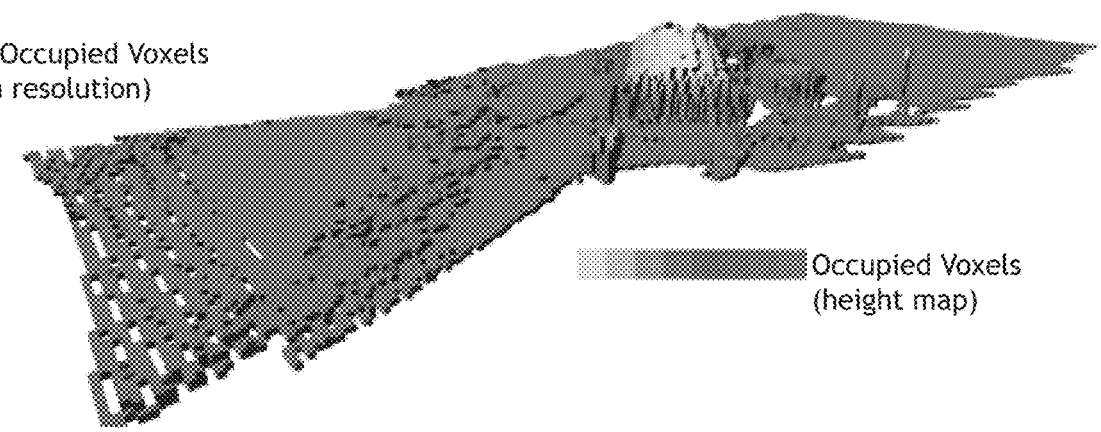
FIG. 2B shows a representation of a map of occupied volume elements in three-dimensional map.
Figure 2C:
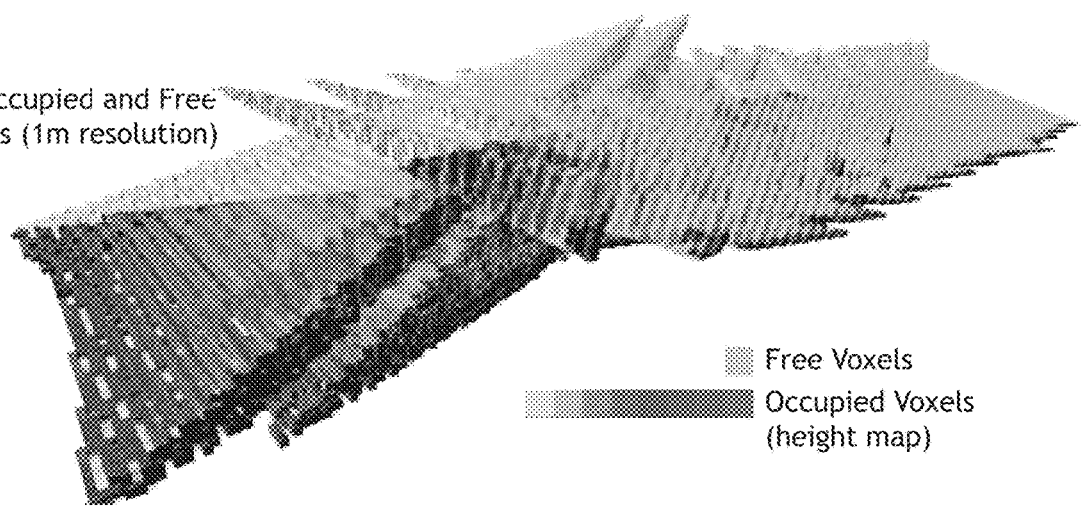
FIG. 2C shows a representation of a map of occupied volume elements and free volume elements in three-dimensional map.

Referring to FIGS. 2A-2C, representations of a LIDAR generated point cloud generated from a mobile platform, and a map of occupied volume elements and free volume elements are shown. A system implementing embodiments of the present disclosure generates or receives a point cloud (as in FIG. 2A) via LIDAR, RADAR, or other imaging technology. The system converts the point cloud into a set of volume elements (as in FIG. 2B), each of a certain minimum size (such as one cubic meter), representing all of the "occupied" points in the point cloud. The system further divides the surrounding area into similarly sized volume elements, and identifies any such volumes where the imaging beam passed through; those volume elements are identified as "free" while the remaining volume elements are identified as "unknown." The total set of volume elements are combined into a three-dimensional world model (as in FIG. 2C). In contrast to a typical three-dimensional point cloud representation, the three-dimensional world model is a three-dimensional data product that explicitly represents free/occupied/unknown volume elements and provides a probabilistic framework for risk-based decision-making and data fusion under redundant measurements.

Applications on-board the mobile platform can understand, in terms of probability, where it is safe to fly (free space) and unsafe to fly (occupied or unknown space). Applications may query data at certain resolutions to provide input to aid a decision-making function. For example, the three-dimensional world model can be applied in manned aviation to provide pilot cueing in degraded visual environments. Alternatively, or in addition, it may be applied to closed-loop flight guidance of autonomous vehicles in unknown environments without the need for remote piloting over a datalink.

Figure 3:
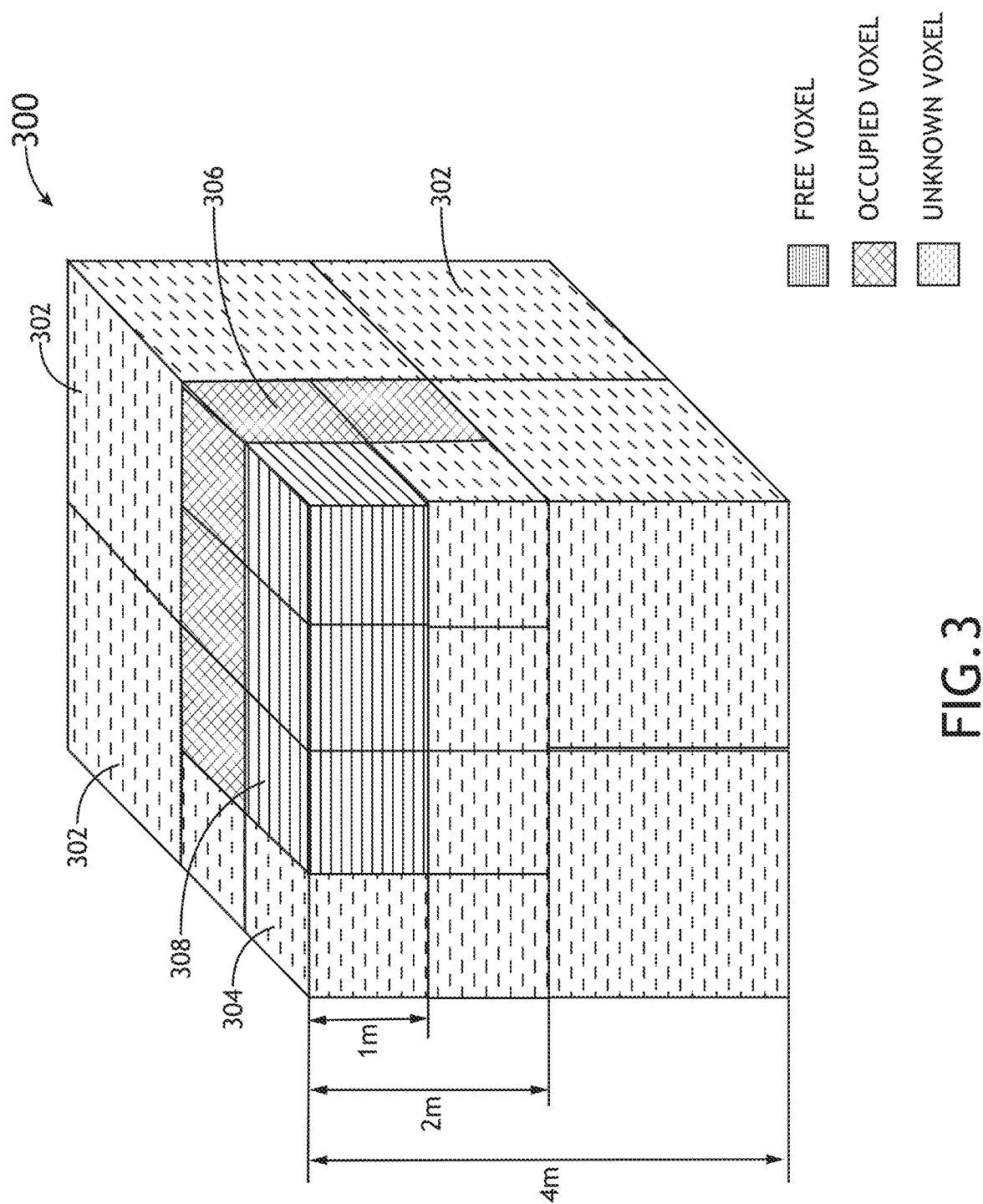
FIG. 3 shows a representation of successively smaller volume elements in a three-dimensional map.

Referring to FIG. 3, a representation of successively smaller volume elements in a three-dimensional map is shown. A cube 300 with edge length of four meters can be divided equally into eight two-meter cubes 302. Each of these two-meter cubes 302 can be further divided into eight one-meter cubes 304, 306, 308. When managing three-dimensional world model data, each of these cubes 300, 302, 304, 306, 308 defines an indication of the occupied probability of the real space represented by the corresponding cube 300, 302, 304, 306, 308. Such probability is used to ascertain the free, occupied, or unknown state of the real space. The cube 300 of space can also be represented by an octree data structure.

Figure 4:
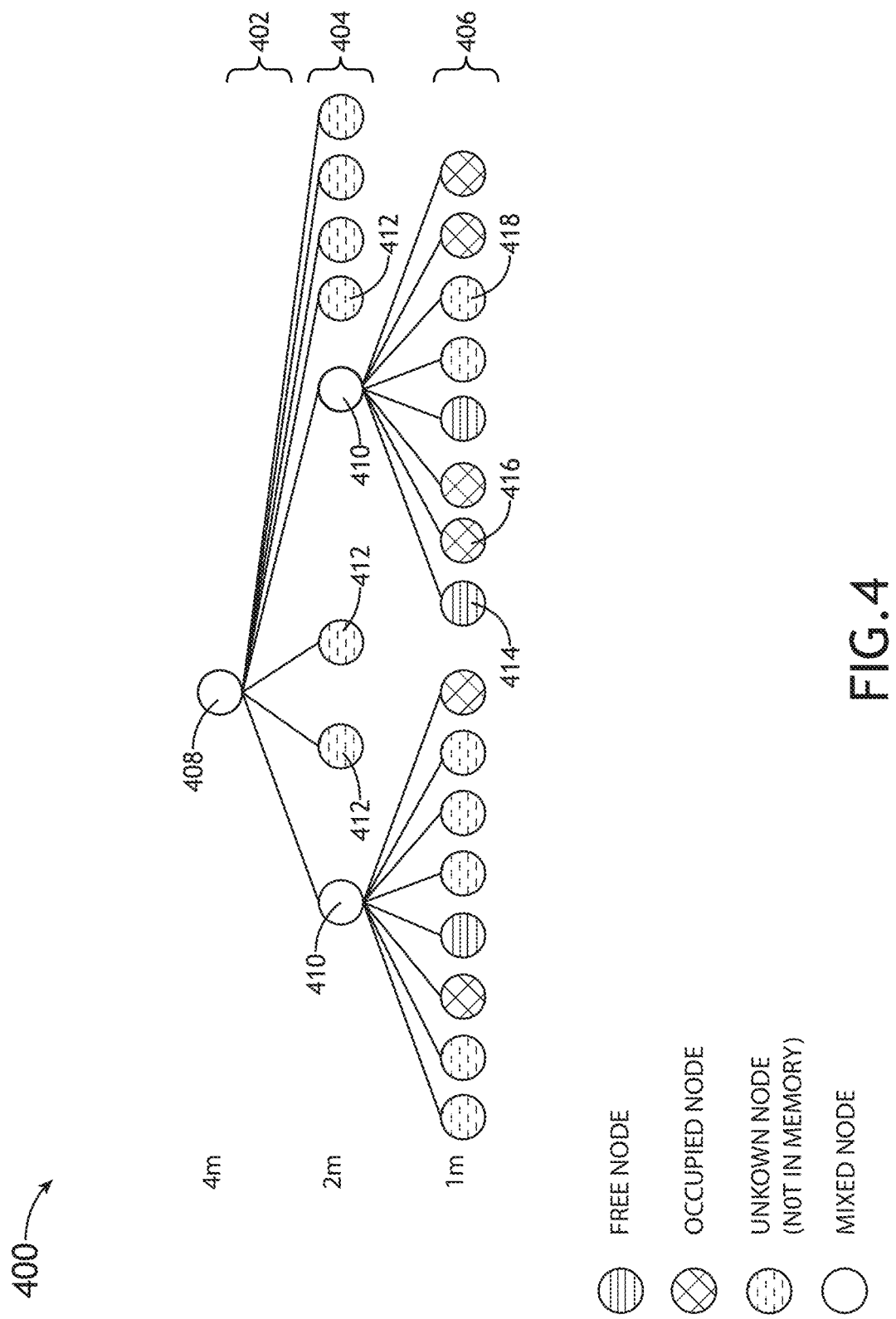
FIG. 4 shows a block diagram of an octree data structure representing successively smaller volume elements in a three-dimensional map.

Referring to FIG. 4, a block diagram of an octree data structure 400 representing successively smaller volume elements in a three-dimensional map is shown. In at least one embodiment, the octree data structure 400 may comprise successively more detailed layers 402, 404, 406, each comprising one or more nodes 408, 410, 412, 414, 416, 418. Each node 408, 410, 412, 414, 416, 418 represents a volume element and carries information about the probability of occupancy for the volume element of space it represents and pointers to any child nodes. Occupancy may be determined at the finest resolution desired.

Each parent node 408, 410, 412 has eight children that each represent a sub-volume element. The top-level node 408 represents a volume element that encloses the entire extent of the three-dimensional world model. When new measurements are incorporated into the three-dimensional world model, the volume elements are updated at a desired maximum depth. The occupancy of a parent node 408, 410, 412 is determined conservatively as the maximum probability of occupancy of all the corresponding child nodes 410, 412, 414, 416, 418, recursively. If all the child nodes 410, 412, 414, 416, 418 of a parent node 408, 410, 412 have the same probability of occupancy, those child nodes 410, 412, 414, 416, 418 may be "pruned" (all child nodes 410, 412, 414, 416, 418 deleted) without loss of information, such that the parent node 408, 410, 412 represents the entire space. This pruning allows for significant memory savings.

Occupancy information for each parent node 408, 410 summarizes child node occupancy at a coarser resolution, allowing a summary of the three-dimensional world model to be provided at any desired level of detail by providing occupancy information at the corresponding tree depth.

Figure 5:
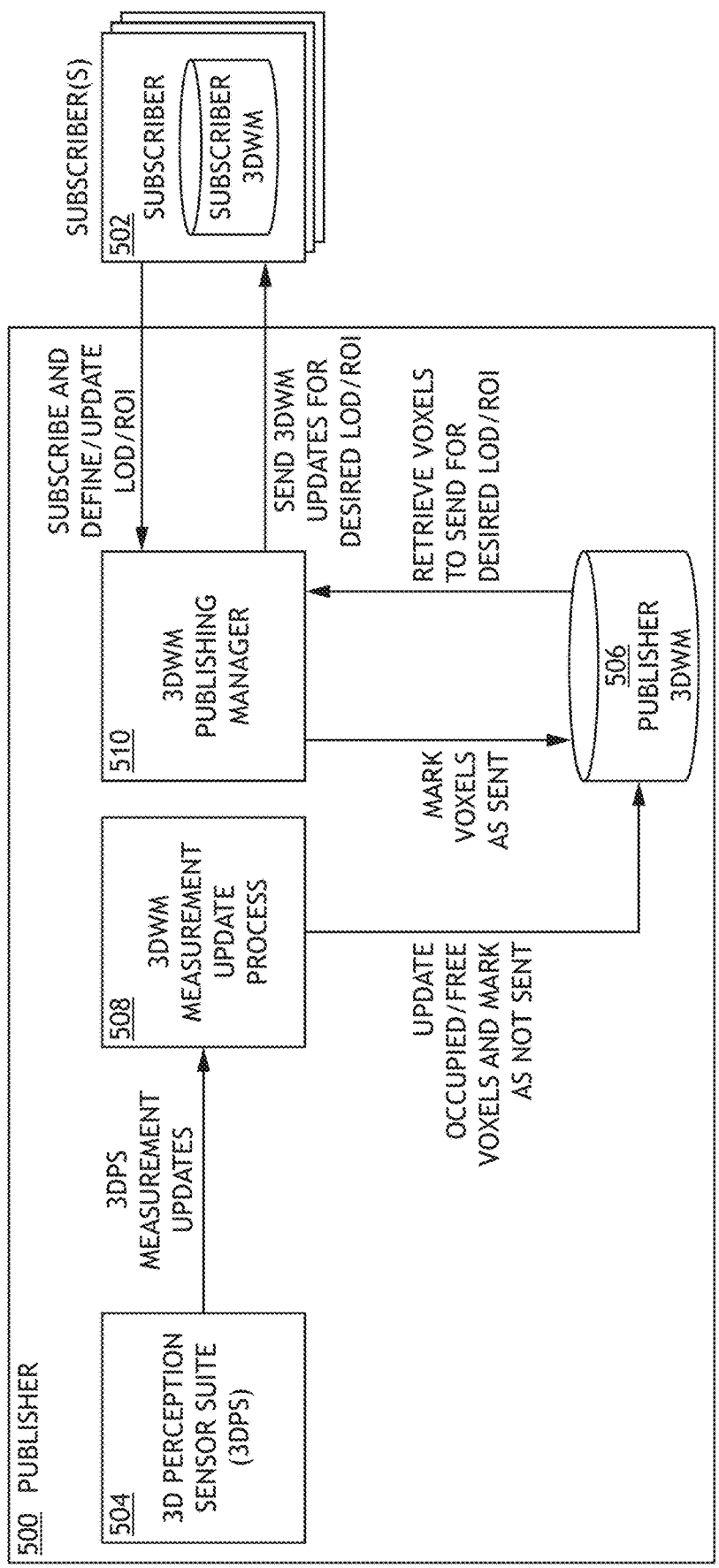
FIG. 5 shows a block diagram of a system for creating, maintaining, and transmitting three-dimensional map data according to embodiments of the present disclosure.

Referring to FIG. 5, a block diagram of a system for creating, maintaining, and transmitting three-dimensional map data according to embodiments of the present disclosure is shown. The system includes a "publisher" 500 or leader and one or more "subscribers" 502. The publisher 500 includes a suite of sensors 504 for gathering data necessary for building and maintaining the three-dimensional world model 506. In at least one embodiment, the three-dimensional world model 506 is maintained in an octree data structure format. Based on the gathered data, the three-dimensional world model 506 is updated via an update processor 508 either by altering the occupied probability of a volume element, or by filling in any previously unknown volume elements.

The one or more subscribers 502 send requests via a data link to the publisher 500 for a three-dimensional world model having a limited region and/or a limited level of detail. The publisher 500 stores the requested limited region and level of detail associated with the subscriber 502, and a publishing manager 510 produces one or more reduced three-dimensional world models according to the subscriber requests as more fully described herein. The reduced three-dimensional world models are then sent to the corresponding subscriber 502.

In at least one embodiment, after each update by the update processor 508, the publishing manager 510 determines which, if any, reduced three-dimensional world models are impacted by the updates based on the octree nodes that are changed by the updates. The publishing manager 510 may then update the impacted reduced three-dimensional world models and push those updated reduced three-dimensional world models to the corresponding subscribers 502.

Each subscriber 502 may find an obstacle-free path to a goal location, given transmitted updates of the reduced three-dimensional world model from the publisher 500. In at least one embodiment, the subscriber 502 may define the desired region. Alternatively, the publisher 500 may define the desired region based on a starting point and a goal point, and a corridor having enough space to capture some feasible paths from the starting point to the goal point. Furthermore, depending on the type of flight operation, the subscriber 502 may need to fly closer to obstacles/terrain, requiring a higher level of detail. In such cases, the subscriber 502 may request such higher level of detail, either generally or with specific reference to a region. The publisher 500 would then provide such updated map. Alternately, the subscriber 502 may want a rapid transmission at a coarse level of detail of the entire region to quickly find a feasible path to start flying towards. While this level of detail may not be sufficient to fly as close to the obstacles/terrain as desired, additional level of detail refinements could be transmitted as the subscriber 502 executes the route in time for the subscriber 502 to fly closer to obstacles.

In at least one embodiment, the publisher 500 may track which updates have been successively received by each subscriber 502 based on a record of the reduced three-dimensional world models received by those subscribers 502, and any changes to region or level of detail. For example, a subscriber 502 may receive a reduced may having a level of detail that does not include a set of volume elements previously indicated as unknown, but indicated as free after an update. When the subscriber 502 requests a different region or level of detail, the updated information may be included as necessary, including all historical updates. The publisher 500 may also record recent measurement updates that have yet to be been published.

In at least one embodiment, the publishing manager 510 may apply additional filtering requirements, such as age of last update, to avoid outdated measurements. The publishing manager 510 may also perform pruning operations on the reduced three-dimensional world models and avoid sending floating point numbers.

In at least one embodiment, updates are pushed on a time schedule such as once per second. Each publication may include the available level of detail for a given region, allowing each subscriber 502 to know they could receive a finer level of detail.

Figure 6:
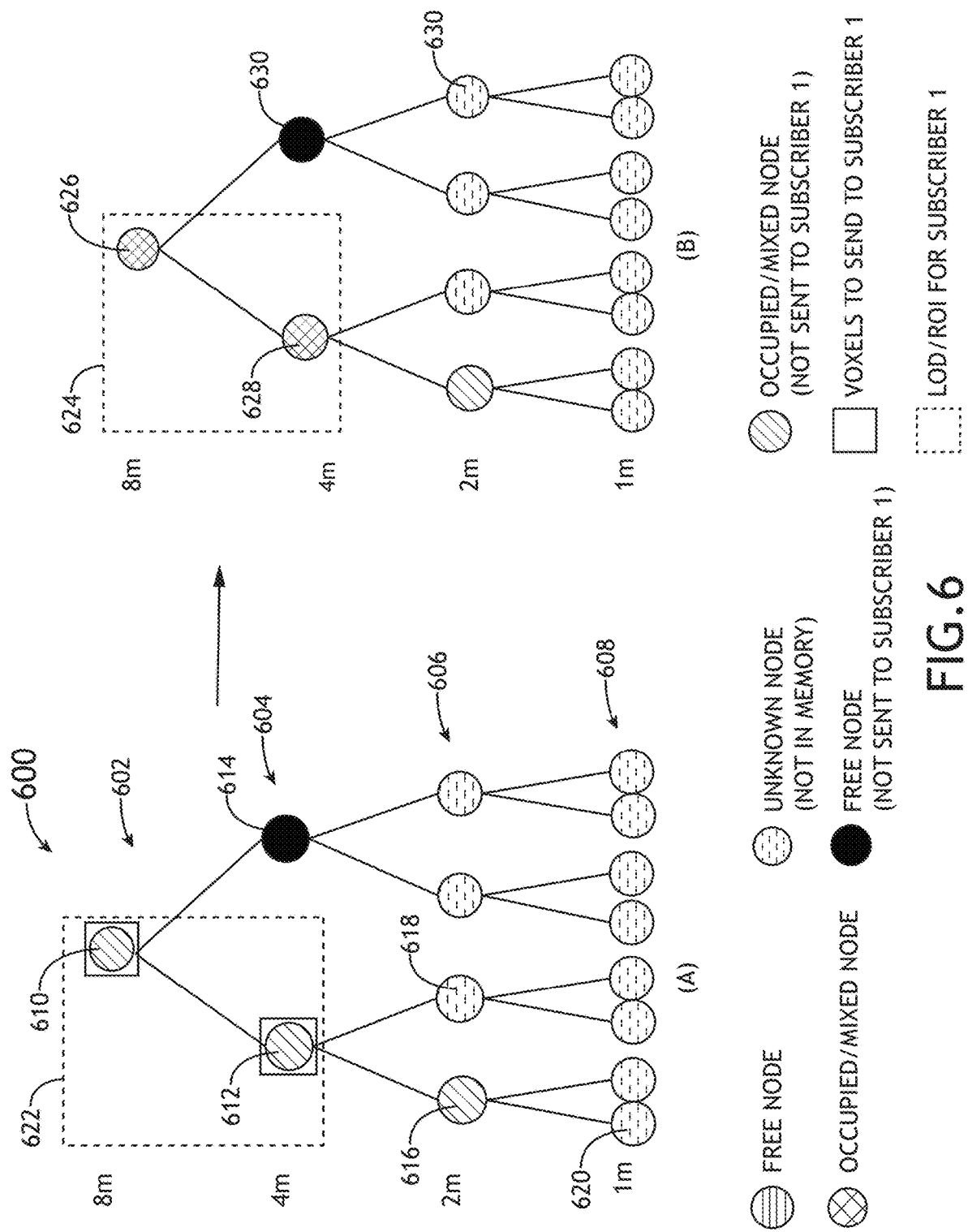
FIG. 6 shows a block diagram of an octree data structure and modified octree data structure suitable for transmission according to embodiments of the present disclosure.

Referring to FIG. 6, a block diagram of an octree data structure 600 and modified octree data structure 624 suitable for transmission according to embodiments of the present disclosure is shown. The octree data structure 624 is substantially complete on publisher side, comprising various levels of detail 602, 604, 606, 608 as described here, where a root node 610 at the highest level 602 comprises a summary of occupied probabilities and pointers to a plurality of child nodes 612, 614 at the next lowest level 604. Those child nodes 612, 614 each comprise a summary of occupied probabilities and pointers to a plurality of their own child nodes 616, 618. Those child nodes 616, 618 each comprise a summary of occupied probabilities and pointers to a plurality of their own child nodes 620. It may be appreciated that, while each parent node 610, 612, 614, 616, 618 is shown with only two child nodes 612, 614, 616, 618, 620, in actual implementation, each parent node 610, 612, 614, 616, 618 may be associated with up to eight child nodes 612, 614, 616, 618, 620.

In one exemplary embodiment, a subscriber connects and requests a four-meter level of detail 604 and a specific region encompassing fewer than all of the nodes 612, 614 at the four-meter level of detail 604. Such restrictions may be understood with reference to a bounding box 622 encompassing the four-meter level of detail 604 and all coarser levels of detail 602, and the lowest level nodes 612 included in the region of interest along with all the corresponding parent nodes 610. Nodes 612, 614, 616, 618, 620 may be pruned if all the corresponding child nodes 612, 614, 616, 618, 620 have the same occupancy. The publisher transmits the nodes 610, 612 of volume elements represented by the nodes 610, 612 within the bounding box 622. In at least one embodiment, the publisher may recharacterize the nodes 610, 612 being sent according the occupied probability at the lowest level of detail 604. The resulting set of nodes 626, 628 in the selected region and level of detail 624 would, in this example, be characterized as "occupied."

Figure 7:
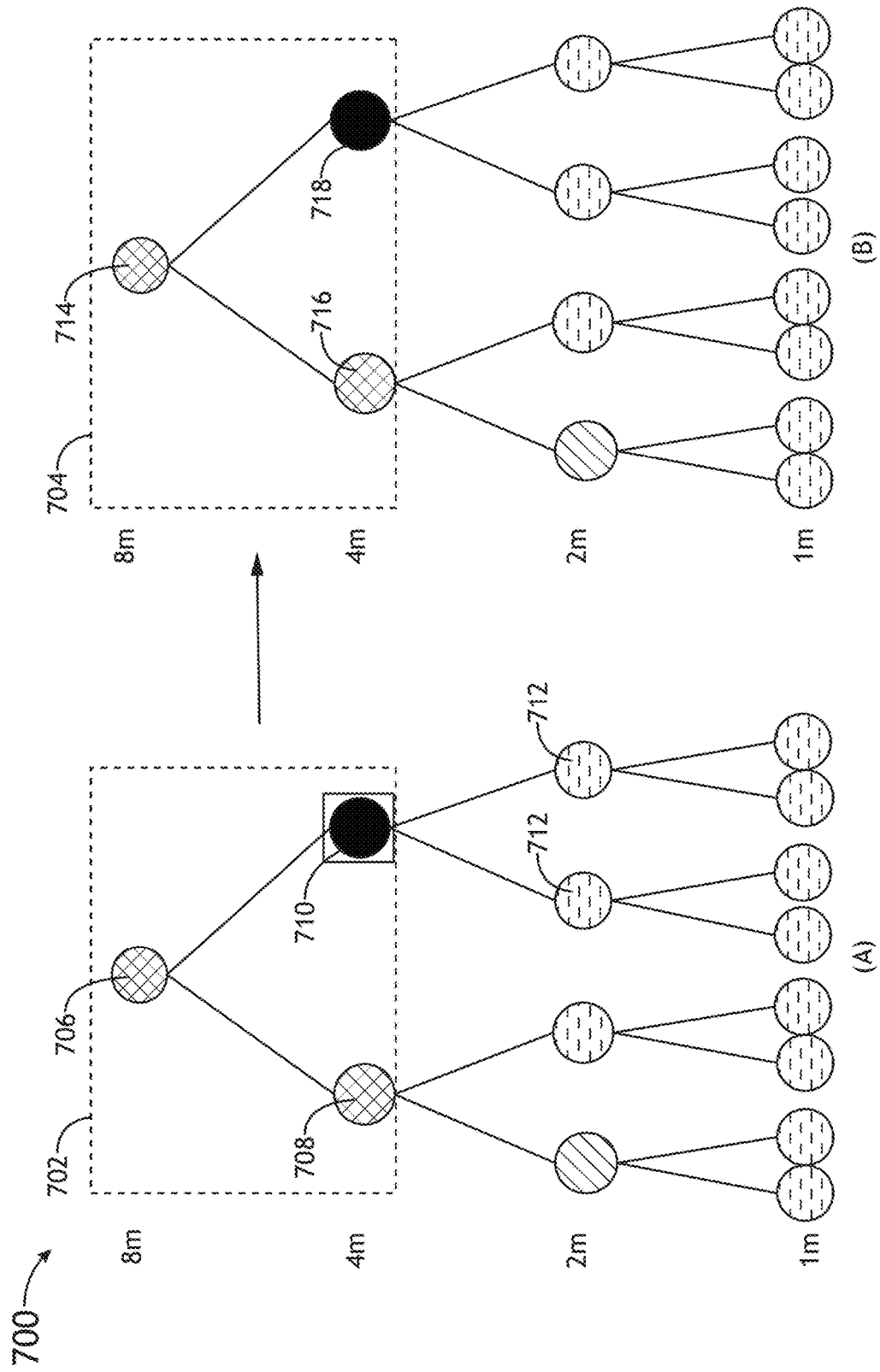
FIG. 7 shows a block diagram of an octree data structure and modified octree data structure suitable for transmission according to embodiments of the present disclosure.

Referring to FIG. 7, a block diagram of an octree data structure 700 and modified octree data structure 704 suitable for transmission according to embodiments of the present disclosure is shown. In at least one embodiment, where a subscriber receives a reduced octree with no free volume elements indicated (such as in FIG. 6), the subscriber may request an expanded region 702 including more nodes 708, 710 at the four-meter level of detail. In at least one embodiment, the publisher may recharacterize the expanded set of nodes 706, 708, 710 being sent according the occupied probability at the lowest level of detail. The resulting set of nodes 714, 716, 718 in the updated region and level of detail 704 would, in this example, include occupied nodes 716 and safe nodes 718 at the finest level of detail.

Figure 8:
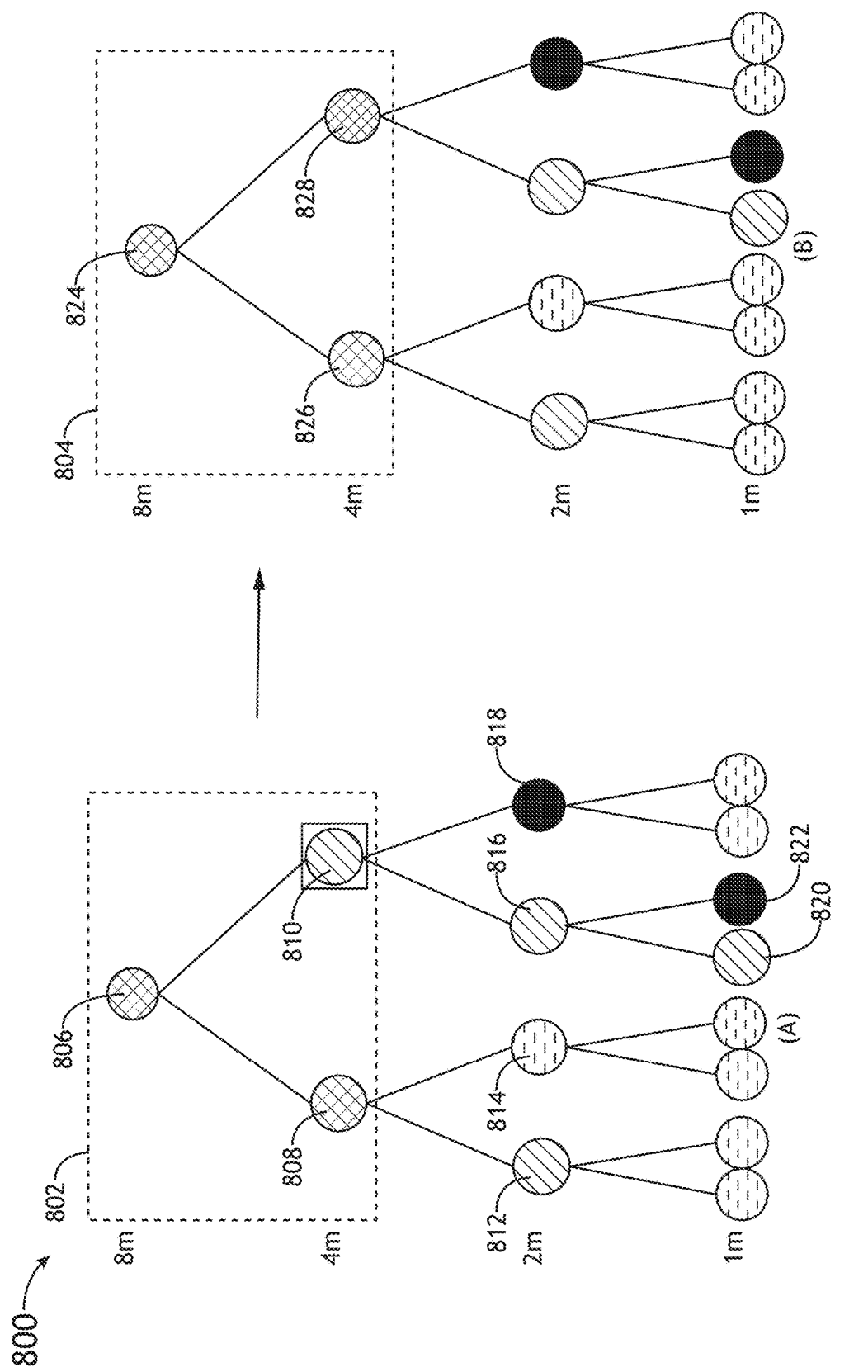
FIG. 8 shows a block diagram of an octree data structure and modified octree data structure suitable for transmission according to embodiments of the present disclosure.

Referring to FIG. 8, a block diagram of an octree data structure 800 and modified octree data structure 804 suitable for transmission according to embodiments of the present disclosure is shown. After an update by the publisher based on new sensor data, previously characterized nodes 806, 808, 810, 812, 814, 816, 818, 820, 822 may be recharacterized. For example, a one-meter node 820, previously unknown, is known to be occupied after an update while another one-meter node 822, previously unknown, is known to be free. The parent node 816 of those nodes 820, 822 may be characterized as "mixed" if using a high accuracy algorithm or "occupied" if using a conservative algorithm.

When updating subscribers, the modified octree data structure 804 may be modified to include newly recharacterized nodes 828 in addition to persistent nodes 824, 826. The publisher also records which nodes 824, 826, 828 have been sent, including updated nodes 828. It may be appreciated that as the four-meter level nodes 826, 828 in the modified octree data structure 804 are the same, they may be pruned before transmission so that only the eight-meter node 824 needs to be sent.

Figure 9:
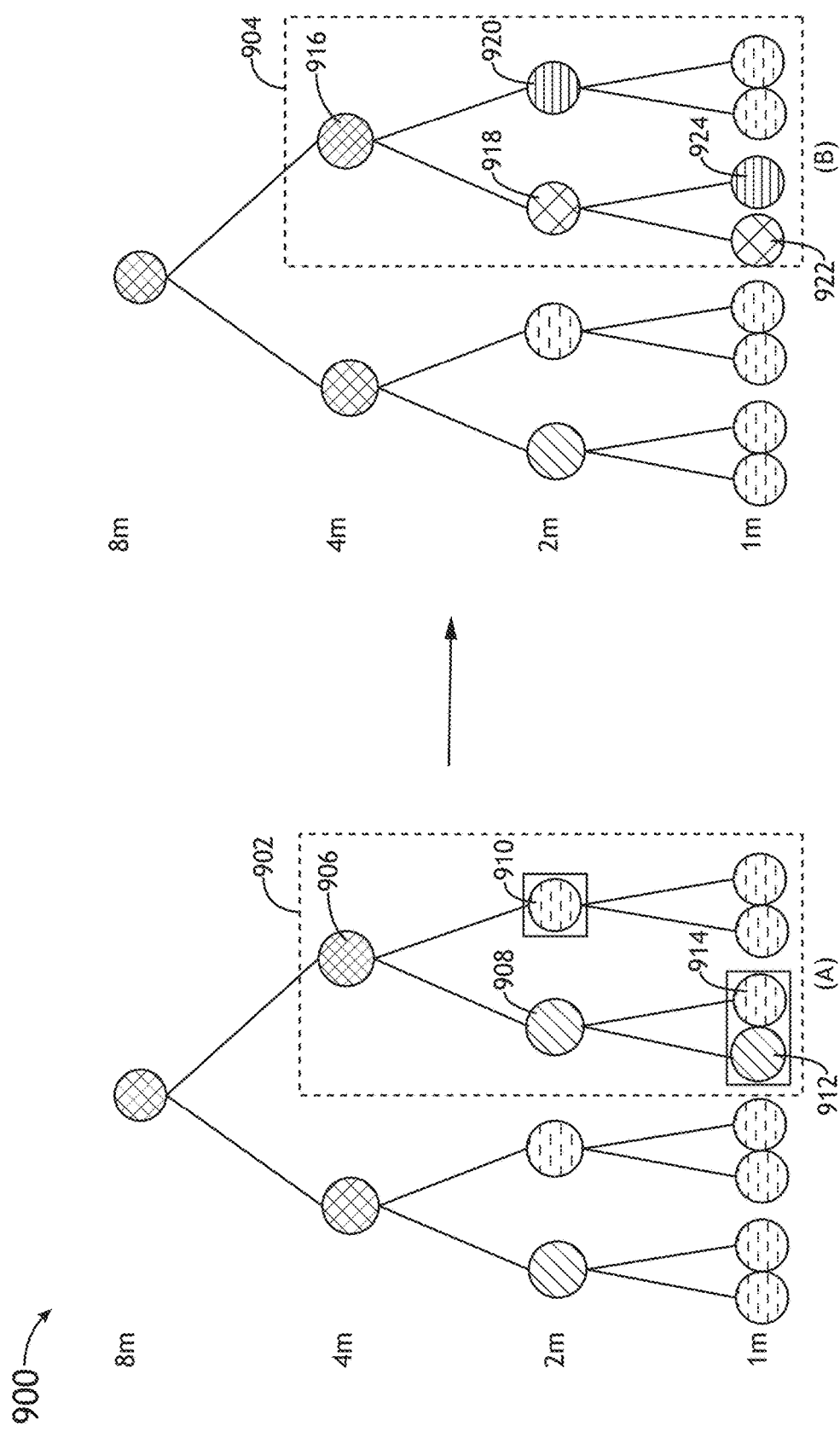
FIG. 9 shows a block diagram of an octree data structure and modified octree data structure suitable for transmission according to embodiments of the present disclosure.

Referring to FIG. 9, a block diagram of an octree data structure 900 and modified octree data structure 904 suitable for transmission according to embodiments of the present disclosure is shown. Where a subscriber identifies a potential path, the subscriber may request a smaller region 902 of interest with increased level of detail one-meter. The publisher identifies nodes 908, 910, 912, 914 necessary to define the occupancy of the region 902. Those nodes 908, 910, 912, 914, or data defining the corresponding volume elements, are transmitted. The publisher maintains updated versions of each node 916, 918, 920, 922, 924 and a list of volume elements not sent to subscribers.

Figure 10:
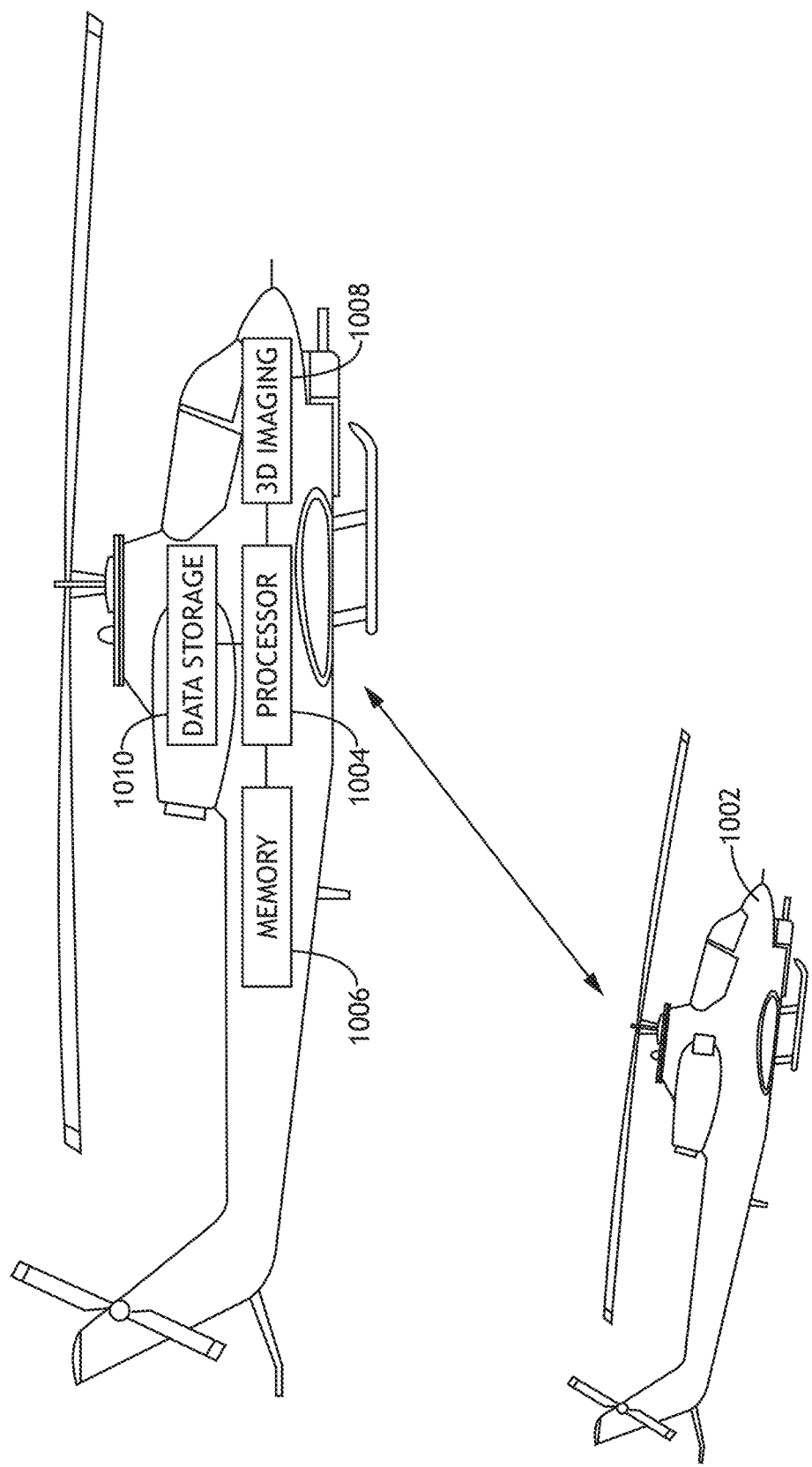
FIG. 10 shows an environmental view of a system of mobile platforms useful for implementing embodiments of the present disclosure.

Referring to FIG. 10, an environmental view of a system of mobile platforms 1000, 1002 useful for implementing embodiments of the present disclosure is shown. The system includes a leader 1000 or publisher, and one or more subscribers 1002. The leader 1000 includes a processor 1004 and memory 1006 configuring the processor 1002 to build a three-dimensional world model via a set of three-dimensional sensors 1008. The three-dimensional world model is stored in a data storage device 1010.

The one or more subscribers 1002 request three-dimensional world models conforming to a specific region of interest at a specific level of detail. The leader 1000 produces such modified three-dimensional world models in the form of octree nodes, truncated or re-characterized at that level of detail, and stored in the data storage device 1010 for periodic update and retransmission.

In at least one embodiment, the modified three-dimensional world models may include nodes representing a coarse level of detail outside the region of interest and the desired level of detail inside the region of interest.

The processor 1004 periodically updates the three-dimensional world model and sends the updated nodes to any subscribers 1002 that requested a region of interest and level of detail including those nodes.

In one exemplary scenario, the leader 1000 and subscribers 1002 may build and share data for Degraded Visual Environment Mitigation. Such capability would allow rotorcraft to operate more effectively in low visibility conditions, which is a focal area for the US Army's Combat Capability Development Command. The three-dimensional sensors 1008 comprise a full Degraded Visual Environment sensor suite. Since this sensor suite is expensive, it may not be installed on all subscribers 1002 in a close formation flight. These subscribers 1002 rely on three-dimensional world model data, over a desired region of interest with low latency and at the level of detail needed to avoid nearby obstacles, transmitted over a datalink.

Figure 11:
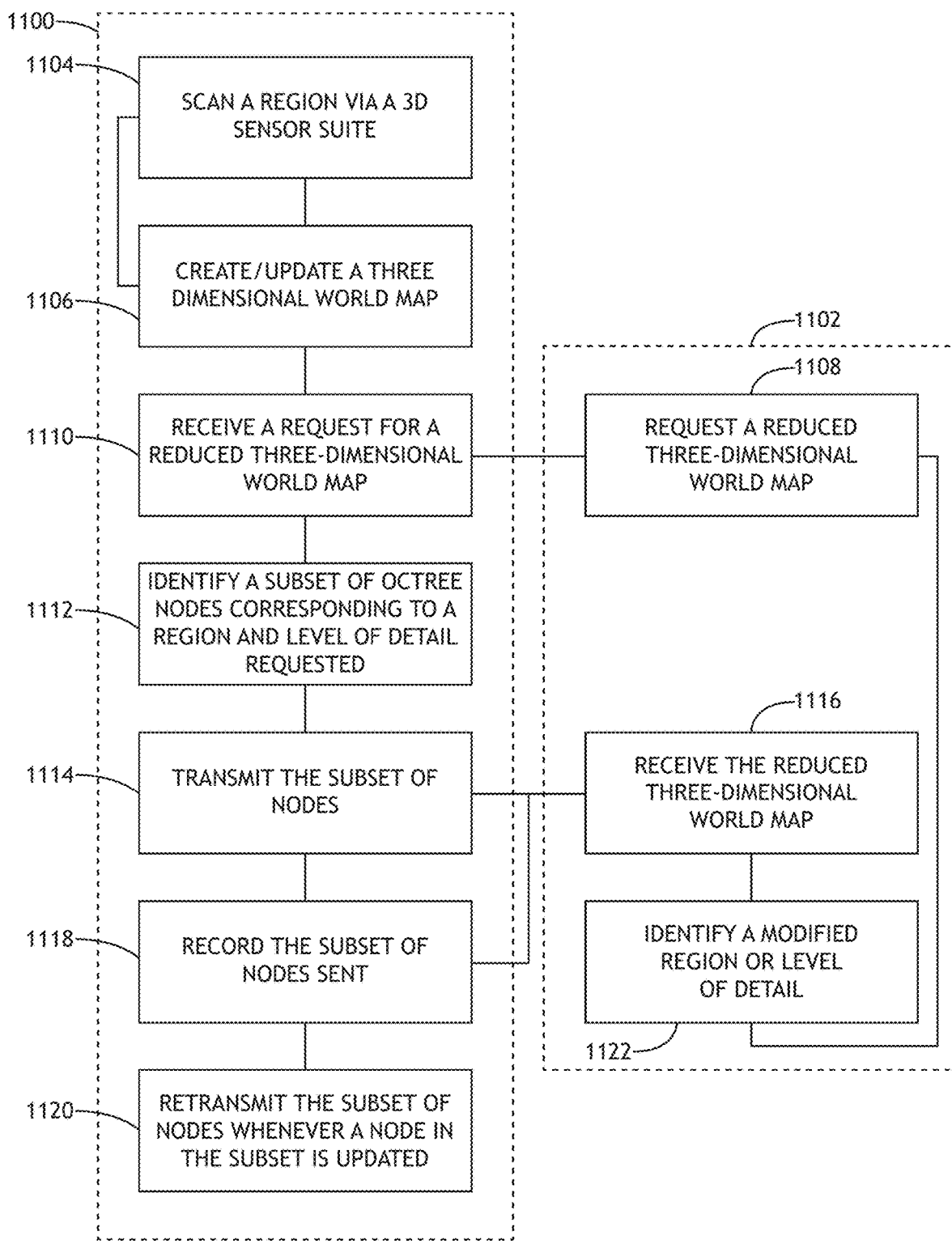
FIG. 11 shows a flowchart of a method for publishing reduced three-dimensional world models.

Referring to FIG. 11, a flowchart of a method for publishing reduced three-dimensional world models is shown. In a system with a leader 1100 or publisher, and one or more subscribers 1102, the leader 1100 scans 1104 an area via a set of on-board three-dimensional sensors and creates 1106 a three-dimensional world model of probable occupancy of volume elements in the space down to a defined level of resolution.

The one or more subscribers 1102 requests 1108 a three-dimensional map from the leader 1100 having a specific region of interest and level of detail. The leader 1100 receives 1110 the request and identifies 1112 a subset of octree nodes representing the region of interest down to the level of detail requested. The lowest level of identified nodes (those representing the finest resolution) may be re-characterized based on the occupancy probability of child nodes at a finer level of detail that will not be transmitted to the subscriber. The subset is transmitted 1114 to the subscriber 1102 that receives 1116 the subset and uses the data to identify a via path or for some other decision process.

In at least one embodiment, the leader 1100 records 1118 the subset of nodes that was sent to each subscriber 1118. The leader 1100 may periodically re-scan 1104 the area and update 1106 the three-dimensional world model. Whenever an update 1106 occurs, the leader may identify which subscribers requested a region and level of interest including updated nodes and retransmit 1120 the updated nodes.

In at least one embodiment, the one or more subscribers 1102 may identify 1122 a new region of interest or level or detail or both, and request 1108 a new map. In at least one embodiment, the region of interest may be relative to each subscriber 1102 such that they update automatically and periodically as the subscribers 1102 move over time.

Systems according to the concepts described herein directly support capabilities that will be needed for key pursuits, such as Future Vertical Lift. It also directly contributes to targeted technology vectors, like sensor fusion, three-dimensional feature extraction/mapping, autonomous operation, and decision aids.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A system comprising:
a suite of three-dimensional sensors;
at least one processor in data communication with the suite of three-dimensional sensors and a memory storing processor executable code for configuring the at least one processor to:
scan an area with the suite of three-dimensional sensors to produce a point cloud;
produce a three-dimensional world model from the point cloud;
convert the three-dimensional world model to an octree data structure;
receive, from a remote subscriber, a request for a three-dimensional world model covering a subset of the area and a level of detail less than a maximum level of detail;
identify nodes in the octree corresponding to the subset of the area and the level of detail;
transmit the identified nodes to the remote subscriber;
periodically receive new three-dimensional world model data from the suite of three-dimensional sensors; and
update an occupied probability of one or more nodes in the octree with the new three-dimensional world model data.

2. The system of claim 1, wherein the at least one processor is further configured to:
record the remote subscriber and the requested subset of the area and level of detail;
determine that one or more nodes corresponding to the requested subset of the area and level of detail have been updated; and
transmit the updated nodes to the remote subscriber.

3. The system of claim 1, wherein
the request defines a subset with respect to a location of the remote subscriber; and
the at least one processor is further configured to continuously update the requested subset based on a current location of the subscriber.

4. The system of claim 1, wherein the at least one processor is further configured to produce a reduced octree corresponding to the requested three-dimensional world model for transmission.

5. The system of claim 4, wherein producing the reduced octree comprises re-characterizing an occupied probability associated with each of a highest level of detail node in the reduced octree with a highest occupied probability of any child nodes of that highest level of detail node.

6. The system of claim 4, wherein producing the reduced octree comprises re-characterizing an occupied probability associated with each of a highest level of detail node in the reduced octree with a summary value corresponding to any child nodes of that highest level of detail node.

7. The system of claim 1, wherein transmitting the identified nodes further comprises transmitting nodes corresponding to the coarsest level of detail for volume elements immediately adjacent to the subset.

8. A method comprising:
scanning an area with a suite of three-dimensional sensors to produce a point cloud;
producing a three-dimensional world model from the point cloud;
converting the three-dimensional world model to an octree data structure;
receiving, from a remote subscriber, a request for a three-dimensional world model covering a subset of the area and a level of detail less than a maximum level of detail;
identifying nodes in the octree corresponding to the subset of the area and the level of detail;
transmitting the identified nodes to the remote subscriber;
periodically receiving new three-dimensional world model data from the suite of three-dimensional sensors; and
updating an occupied probability of one or more nodes in the octree with the new three-dimensional world model data.

9. The method of claim 8, further comprising:
recording the remote subscriber and the requested subset of the area and level of detail;
determining that one or more nodes corresponding to the requested subset of the area and level of detail have been updated; and
transmitting the updated nodes to the remote subscriber.

10. The method of claim 8, further comprising producing a reduced octree corresponding to the requested three-dimensional world model for transmission.

11. The method of claim 10, wherein producing the reduced octree comprises re-characterizing an occupied probability associated with each of a highest level of detail node in the reduced octree with a highest occupied probability of any child nodes of that highest level of detail node.

12. The method of claim 10, wherein producing the reduced octree comprises re-characterizing an occupied probability associated with each of a highest level of detail node in the reduced octree with a summary value corresponding to any child nodes of that highest level of detail node.

13. The method of claim 8, wherein transmitting the identified nodes further comprises transmitting nodes corresponding to the coarsest level of detail for volume elements immediately adjacent to the subset.

* * * * *